United States Patent [19]

Kimura et al.

[11] Patent Number: 4,563,068
[45] Date of Patent: Jan. 7, 1986

[54] LIGHT MEASURING DEVICE FOR A SINGLE LENS REFLEX CAMERA

[75] Inventors: Kazuo Kimura, Sakai; Yasuo Yamazaki, Mino; Hiromu Mukai, Kawachinagano, all of Japan

[73] Assignee: Minolta Camera Kabushiki Kaisha, Osaka, Japan

[21] Appl. No.: 580,872

[22] Filed: Feb. 16, 1984

[30] Foreign Application Priority Data

Feb. 18, 1983 [JP] Japan ................... 58-26844

[51] Int. Cl.$^4$ .................... G03B 3/00; G03B 7/099
[52] U.S. Cl. ....................... 354/402; 354/429; 354/480; 354/154
[58] Field of Search ............. 354/429, 432, 479, 402, 354/406–408, 433, 434, 431, 480, 154

[56] References Cited

U.S. PATENT DOCUMENTS

| 4,171,154 | 10/1979 | Fukuhara | 354/152 X |
| 4,322,142 | 3/1982 | Kawamura et al. | 354/432 X |
| 4,437,741 | 3/1984 | Sato | 354/479 |
| 4,456,352 | 6/1984 | Sato | 354/429 |
| 4,456,354 | 6/1984 | Mizokami | 354/429 X |

FOREIGN PATENT DOCUMENTS 57-108833  7/1982  Japan ..................... 354/402

*Primary Examiner*—William B. Perkey
*Attorney, Agent, or Firm*—Price, Gess & Ubell

[57] ABSTRACT

A light measuring device for a single lens reflex camera includes a principal or main mirror capable of dividing light passing through an objective lens towards a finder system and towards a film plane. A submirror is provided behind the main mirror and directs the light passed therethrough towards the film plane for ultimately determining a focusing condition and a measurement of light intensity. A pair of focus detecting photosensor arrays, as well as a spotlight measuring photocell, is arranged relative to the submirror to receive the object light. The auxiliary mirror can be formed with a center portion for reflecting the light through the photocell arrays and a second light-reflecting plane having light diffusive characteristics for directing light for the detection of light measurement.

7 Claims, 8 Drawing Figures

LIGHT MEASURING DEVICE FOR A SINGLE LENS REFLEX CAMERA

BACKGROUND OF THE INVENTION

1. Field of the Invention

The present invention relates to a light measuring device for a single lens reflex camera, and more particularly relates to such a light measuring device which measures light passing through the camera objective lens, both for the exposure determination, i.e. the determination of shutter speed and/or diaphragm aperture and for the detection of the focusing condition.

2. Description of the Prior Art

In the field of the single lens reflex camera, there have been proposed various cameras which measure light for both the exposure determination and the detection of focusing condition. For the light measurement for the exposure time, various types are available, such as a spot light measuring device which measures the light coming from a comparatively narrow area nearby the optical axis of the camera objective lens. Another type is an average or integral light measuring device which measures the light from almost the entire portion of the scene to be photographed.

On the other hand, for the detection of off focusing condition, a device has been known which, as disclosed in Japanese laid-open patent application SHO No. 52-95221, employs a pair of light receiving or photosensor arrays, each array having a plurality of light detecting elements arranged in a line. The device is arranged such that the two photosensor arrays look through different regions of the exit pupil of an objective lens at an object on the optical axis of the objective lens.

It should be recognized here that the spot light measuring device measures the intensity of the light coming from a narrow area of the object on the optical axis of the objective lens, while the focus detecting device detects the focusing condition in a comparatively narrow portion of the object image on the optical axis on a given image forming or focal plane. Thus, both devices measure relatively narrow areas of the object on the optical axis but it is difficult for them to commonly use the same light receiving means because they measure different subjects, i.e. one measures the intensity of light while the other measures focusing condition.

Accordingly, to enable both the spot light measuring and the focus detection, it is necessary to provide two photosensor arrays for the focus detection and a light receiving element for the light measurement for exposure determination. However, there has not been proposed any such combination of the photosensor arrays and a spot light measuring device nor any optical system for introducing light to them.

SUMMARY OF THE INVENTION

An object of the present invention is to provide a light measuring device for a single lens reflex camera which can effect both the focus detection and the spot light measurement.

Another object of the present invention is to provide such a light measuring device as mentioned above and which is simple in construction.

To attain those objects, the present invention has a feature wherein an auxiliary mirror is disposed to the rear of the main reflex mirror of the single lens reflex camera and in the vicinity of the film plane to be in parallel with the film plane such that the auxiliary mirror directs the light from an object to be photographed to a pair of focus detecting photosensor arrays as well as to a spot light measuring photocell in such a manner that the area on the auxiliary mirror required for the photosensor arrays to receive the object light through respective areas in the exit pupil of the camera objective lens is narrow and has an elongated strip-like shape and is extremely small in comparison with the area of the auxiliary mirror required for the spot light measuring. According to the present invention, the auxiliary mirror is formed, at the center thereof, with a first light reflecting plane of a substantially rectangular shape for reflecting the light incident thereon to the pair of photosensor arrays, and around the first plane, with a second light reflecting plane having light diffusive characteristics. The light having passed through the objective lens and reflected by the first light reflecting plane is directed to the above mentioned pair of photosensor arrays for the detection of a focusing condition of the objective lens, while the light having passed through the objective lens and reflected by the second light reflecting plane is directed to the photocell for the spot light measuring. Accordingly, although the photocell for the spot light measuring does not receive the light reflected by the first light reflecting plane, the amount of light reflected by the latter is negligible because the first light reflecting plane is narrow and elongated to reflect a small amount of the light bundle.

DETAILED DESCRIPTION OF THE PREFERRED EMBODIMENTS

Figure 1:
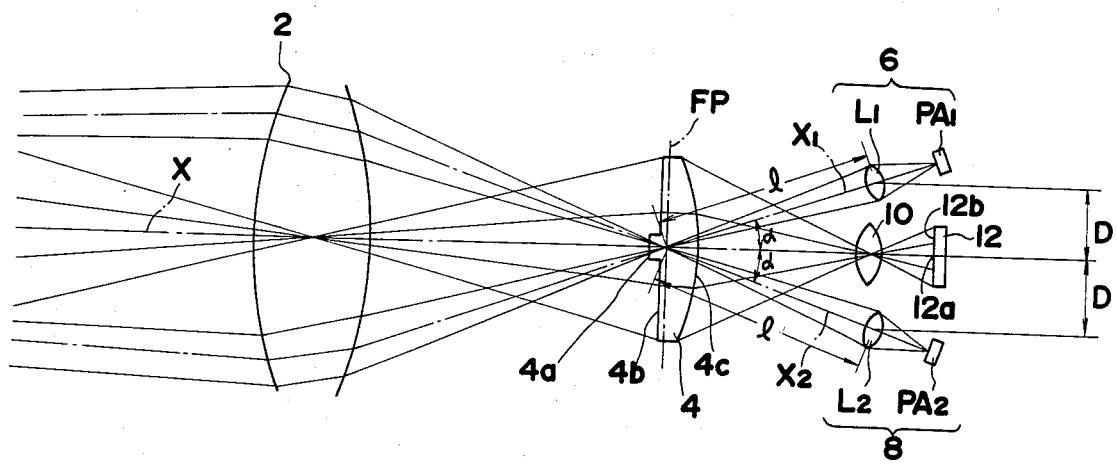
FIG. 1 is a schematic illustration of the basic arrangement of the optical system according to an embodiment of the present invention.

An embodiment of the present invention is now be explained in detail with reference to the drawings. FIG. 1 is an expanded illustration for explaining the basic arrangement of the optical system in an embodiment of the present invention. With reference to the Figure, an objective lens 2 is expected to focus the light from an object to be photographed (object light) on a given focal plane FP and has an optical axis X. Optical member 4 is formed, at its center, with a rectangular transparent portion 4a which intersects the optical axis X and extends perpendicularly to the optical axis X. Around the transparent portion 4a, optical member 4 has a light diffusive front surface 4b and a convex rear surface 4c. In practice, a later-to-be described auxiliary mirror 18 serves as the optical member 4 and is disposed before the given focal plane FP. A first focus detecting optical system 6 includes a lens L1 and a first photosensor array PA1 which is conjugate with the focal plane FP with respect to the lens L1. The first focus detecting optical system 6 views a portion of the exit pupil of the objective lens 2 through the transparent portion 4a from the center of the focal plane FP. The first photosensor array PA1 includes plurality of photoelectric elements arranged in a line in the direction parallel with the plane of the paper of the drawing, i.e. the direction in which the transparent portion 4a extends. A second focus detecting optical system 8 is arranged symmetrically with the first focus detecting optical system 6 with respect to the optical axis X and includes a lens L2 and a second photosensor array PA2 which have the same functions as those of the first lens L1 and the first photosensor array PA1.

With the above arrangement, the focus condition of the objective lens 2 is detected from the output conditions of the photosensor arrays PA1 and PA2. The explanation of the manner of the focus detection is not to be made here but reference should be made to a Japanese laid-open application with a laid-open No. 52-95221 which describes that feature in detail. To ensure a required preciseness or accuracy of the focus detection, the photosensor arrays should be arranged to receive only the light having passed through the transparent portion 4a but not to receive the light diffused by the diffusive surface 4b or refracted by the lens 4c. Although, in FIG. 1, the photosensor arrays PA1 and PA2 might seem to receive light having passed through the lens surface or convex surface 4c, there is no problem because the optical member 4 is in practice composed of a light reflecting member which introduces the light reflected by the portion thereof corresponding to the transparent portion, to the different direction from that in which the light rays reflected by the portion of the reflecting member corresponding to the light diffusive surface are directed.

A photocell 12 is disposed to the rear of a lens 10 for the light measurement for the exposure determination. The lens surface 4c of the optical member 4 is formed or arranged to form the image of the exit pupil of the objective lens 2 in the vicinity of the lens 10 for the light measurement. With such an arrangement, the light bundle used for the light measurement is partially blocked or the distribution of light intensity is changed by a diaphragm of the objective lens 2. The photocell 12 for the light measurement includes, as shown in the front view of FIG. 2, a first light receiving portion 12a for measuring the light from a central small area of the scene to be photographed, and a second light receiving portion 12b around the first portion. As is apparent from the observation of FIG. 1, the first light receiving portion 12a is adapted for spot light measurement for measuring a comparatively narrow area of the photographic scene in the vicinity of the optical axis of the objective lens 2 while the sum of the outputs of both the first and second light receiving portion 12a and 12b is used for the average or integral light measurement for measuring the brightness of substantially the entire area of the scene to be photographed. It is to be understood that although the transparent portion 4b is, in practice, composed of a light reflecting plane which reflects the light incident thereon towards the optical systems 6 and 8 for the focus detection and the light reflected thereby can not reach the photocell 12 for the exposure determining light measurement, the area of the transparent portion 4a is so extremely small in comparison with the area viewed or covered by the first light receiving portion 12a that the transparent portion 4a will have little effect on the spot light measurement.

Figure 3:
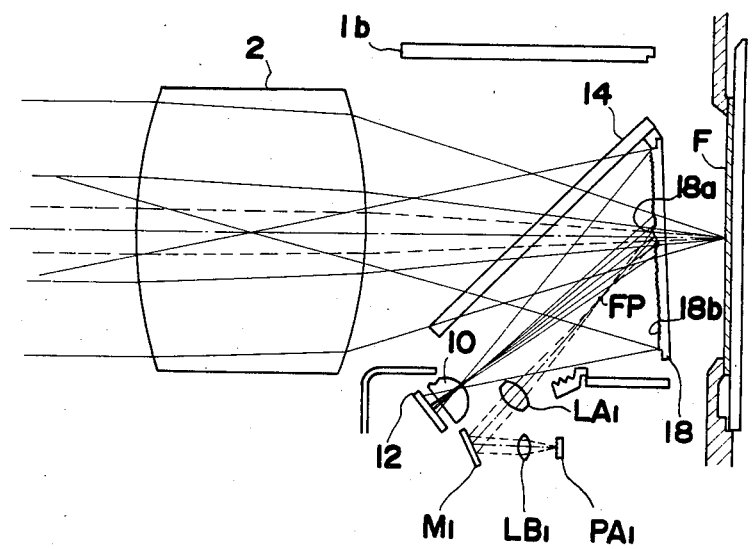
FIG. 3 is a schematic side elevational view of an embodiment of the present invention.
Figure 4:
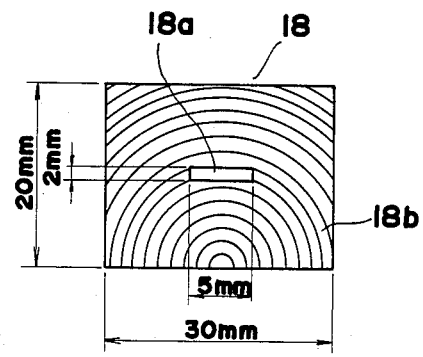
FIG. 4 is a front view of the auxiliary mirror of the embodiment.
Figure 7:
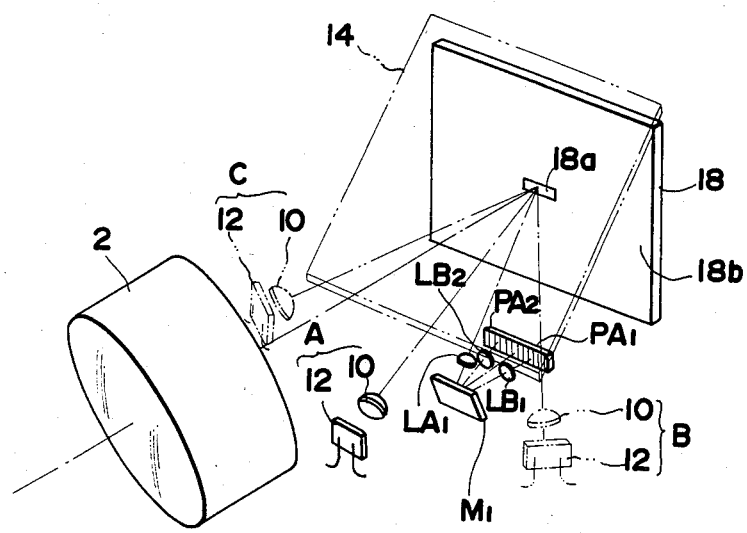
FIG. 7 is a perspective view which shows various examples of arrangements of the photocell for the light measurement for exposure determination.

FIG. 3 shows a practical embodiment having the principal construction as described above. In FIG. 3, reference numeral 2 denotes an objective lens. A main mirror 14 is formed as a half-mirror extirely. The light reflected by the main mirror 14 is directed to a focusing plate 16. The reference character FP shows a given focal plane that is optically equivalent to the film plane F. An auxiliary mirror 18 is rotatably supported on the main mirror 14 and corresponds to the optical member 4 in FIG. 1. The auxiliary mirror 18 assumes, at its viewing condition, the position close to the film plane F and almost parallel to the same. Upon photography, the auxiliary mirror 18 overlaps the main mirror 14 and retracts to the outside of the photographic light path. The auxiliary mirror 18 has the size of 20 mm in its length and 30 mm in its width and is formed with a first reflecting portion 18a composed of a rectangular flat reflecting plane of the size of 2 mm in width and 5 mm in length. The auxiliary mirror 18 is arranged such that the first reflecting portion 18a extends perpendicularly to the plane of the drawing with the first reflecting portion being slant downwardly. Accordingly, the light passing through the objective lens 2 and the main mirror 14 and incident on the first reflecting portion 18a is reflected by the latter and directed to the first and second photosensor arrays PA1 and PA2. In Figure 3, the reference characters LA1, LB1 and LB2 which is disposed opposite to LB1 and shown in FIG. 7 correspond to lenses L1 and L2 shown in FIG. 1, while M1 denotes mirror.

The portion of the auxiliary mirror 18 other than the first reflecting portion 18a is a second reflecting portion 18b composed of a concentric Fresnel mirror having its center shifted downward from the center of the auxiliary mirror 18. The second reflecting portion 18b corresponds to the lens surface 4c in FIG. 1. The second reflecting portion 18b is adapted to form the image of the exit pupil of the objective lens 2 in the vicinity of the light measuring lens 10 and is given a light reflecting characteristic suitable for that purpose. Additionally, the surface of the second reflecting portion 18b is formed as a light scattering reflecting surface and also serves as the scattering surface 4b.

Figure 2:
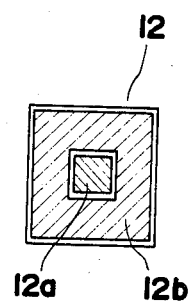
FIG. 2 is a front view of a photocell for exposure determination.
Figure 5:
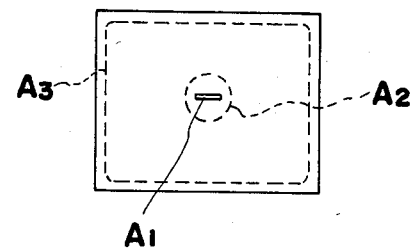
FIG. 5 is an illustration showing the areas of the photographic scene to be detected or viewed by respective photoelectric means.

The photocell 12 for the exposure determining light measurement has the double area construction as shown in FIG. 2. A first light receiving portion 12a at its center receives the light reflected from the area other than the first reflecting portion 18a but the effect of not receiving the light from the first reflecting portion is so small as to be negligible because, as shown in FIG. 5, the area A1 which is not measured by the photocell 12 due to the first reflecting portion 18a is extremely small in size. Hence, no problem is expected to occur if the output of the first light receiving portion 12a is used as the result of a spot light measurement. Further, if the output of the second light receiving portion 12b is added to the output of the first light receiving portion, light measurement is to be made for the substantially entire area A3 of the scene to be photographed. In this case, the ratio of the area A1 for which light measurement is not made due to the first reflecting portion 18a, to the entire area A3 for which light measurement is made, will be further small so that no problem will occur even if the sum of the outputs of both light receiving portion 12a and 12b is the result of an average or integral light measurement. Additionally, if the output of the first light receiving portion 12a is weighed more than that of the second light receiving portion 12b upon summation of the outputs of both light receiving portion 12a and 12ba center-weighed average light measurement can be made. On the other hand, if the output of the second light receiving portion 12b is weighed, the property of concentrating to the light passing through the central portion of the objective lens is removed and a more flattened average light measurement can be made.

Returning to FIG. 1, in order to detect the focusing condition through an area of the exit pupil of an objective lens that corresponds to the aperture size of F:5.6 in the case where the objective lens 2 is a standard lens, the angle $\alpha$ made by the optical axis X and the main light paths X1 or X2 of the light bundle for the focus detection will be about 5°. Thus, assuming that the distance l from the given focal plane FP to the focus detection lens L1 or L2 is 10 mm, the distance D from the optical axis X of the objective lens to the focus detection lens L1 and L2 will be 0.9 mm. Accordingly the diameter of the focus detection lenses L1 and L2 in the direction of the width of photosensor arrays PA1 and PA, i.e. the direction parallel to the plane of the paper of the drawing will be extremely restricted. Additionally, as the distance between the focus detection lenses L1 and L2 will be extremely small, both lenses L1 and L2 may be integrally molded from plastic material, resulting in the compactness of the device and easiness of assembling the same.

Further, although the illuminance on the photosensor arrays PA1 and PA2 depends on the focal distances and diameters of the focus detection lens L1 or L2, the illuminance may be increased by making the focus detection lenses L1 and L2 extended laterally i.e. in the direction normal to the plane of the paper of the drawing since the diameter of the focus detection lenses L1 and L2 measured in the direction parallel to the plane of the paper of FIG. 1 is extremely restricted. Moreover, the illuminance may be made independent of the F number by increasing the angle $\alpha$ as well as increasing the diameters of the focus detecting lenses such that the focus detecting optical systems 6 and 8 views a relatively large area of the exit pupil of the objective lens 2, and by providing in the focus detection light path a diaphragm which can be opened or stopped-down in accordance with the aperture or F number of the objective lens 2 such that the diaphragm is stopped down to a small size with the F number of the objective lens 2 being small while the diaphragm is opened to a larger size with the F number of the objective lens 2 being large. Still further, apertures such as pin holes may be arranged in the vicinity of the focus detection lenses such that the apertures are displaced or shifted, without changing their size, in accordance with the F number, i.e. the fully open aperture value of the objective lens. With this construction, as the F number of the objective lens is smaller, the focus detection is made by measuring the light passing through the area of the exit pupil that is more distant from the optical axis of the objective lens.

Figure 6:
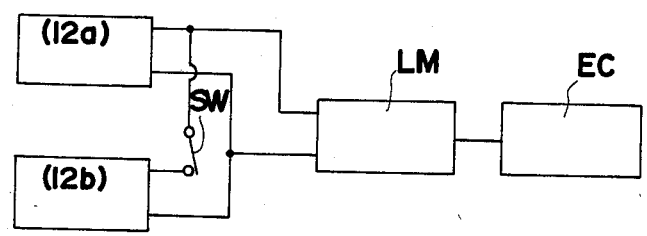
FIG. 6 is a circuit diagram showing an automatic exposure control circuit coupled with the embodiment of the present invention.

FIG. 6 shows an exposure control circuit to be associated with the light measuring device according to the present embodiment. The first and second light receiving portions 12a and 12b of the exposure determining photocell 12 are connected to a light measuring circuit LM in parallel with each other with a manually operable selector switch SW being interposed between the light receiving portions. When the selector switch SW is open, only the output of the first light receiving portion 12a is applied to the light measuring circuit LM which in turn applies to an exposure control circuit EC an output relying on the output of the first light receiving portion, resulting in automatic exposure control relying on a spot light measurement. When the selector switch SW is closed, the sum of the outputs of the first and second light receiving portion is applied to the light measuring circuit LM which in turn applies to the exposure control circuit an output relying on the sum so that automatic exposure control is effected based on the average light measurement.

In the present embodiment, the focus detecting optical system is required to be adjusted precisely as to its positioning, while the exposure determining light measuring optical system receives the light reflected by the relatively large second reflecting portion 18b of the auxiliary mirror 18 and may not measure exactly the central portion of the scene to be photographed as the focus detecting optical system must do. Hence, the exposure determining light measuring optical system has the flexibility of its location which may be changed by changing the directional light reflecting characteristics of the Fresnel mirror used for the second light reflecting portion 18b of the auxiliary mirror 18. Accordingly, upon design of the device, the location of the focus detecting optical system is determined at first and then the exposure determining light measuring optical system may be located in a remaining space. For example, the lens 10 and photocell 12 may be located at the position B or C in place of A (the embodiment) in FIG. 7 with the directional light reflecting characteristics of the second reflecting portion 18b being determined to adapted for such location.

According to the present embodiment, the spot light measuring for exposure determination and the focus detection with not interfere each other and a central portion spot light measuring and average light measuring are selectively effected by selecting the light receiving portion of the photocell.

Figure 8:
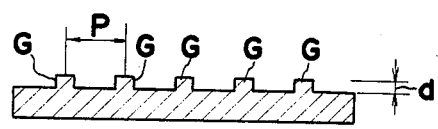
FIG. 8 is a cross-sectional view of the first light reflecting plane of a modified embodiment.

Additionally, the first reflecting portion (18a) is not limited to be a plane mirror. For example, in FIG. 8, the first reflecting surface (18a) has plurality of projections for cutting off a high frequency component which would not utilized for detecting the focusing condition. The optical thickness d of said projections is selected to $\lambda/4$, wherein $\lambda$ is a design wave length. The projections are arranged in a row at a predetermined pitch P.

What is claimed is:

1. A light measuring device for a single lens reflex camera having an objective lens and a finder system, comprising:

means, having a light dividing area, for dividing light which has passed through the objective lens into light reflected toward the finder system and light passed through said light dividing area toward a film plane;

means for reflecting the light which has passed through said light dividing area of said dividing means, said reflecting means being located behind the dividing means and in almost a parallel relationship to said film plane, said reflecting means having a first reflecting means constituted by a plane mirror for reflecting light incident on a predetermined area defined so as to be smaller than an area surrounded by marginal rays of a predetermined F-number of the objective lens, said marginal rays being incident on a point on which the optical axis of the objective lens intersects the film plane, and second reflecting means, provided around said first reflecting means, for reflecting light incident thereon, said second reflecting means having a diffusive characteristic;

means for detecting a focusing condition of the objective lens, said detecting means including at least a photo sensor array which has plurality of light receiving elements arranged in a row, said photo sensor array being directed to receive the light reflected from said first reflecting means; and means for measuring light which has passed through said objective lens, said measuring means including at least a first light receiving element positioned to receive the light reflected from said second reflecting means, and means for condensing the light reflected from said second reflecting means into said first light receiving element, said condensing means being located near said first light receiving element.

2. The invention of claim 1, wherein said second reflective surface has a directivity toward said first light receiving element.

3. The invention of claim 2, wherein said measuring means further includes a second light receiving element located around said first light receiving element.

4. The invention of claim 3, wherein said measuring device includes means for calculating a spot metering value in accordance with an output of said first light receiving element, and means for calculating an averaged light measuring value in accordance with sum of the outputs of said first and second light receiving elements.

5. The invention of claim 1, wherein said first reflecting means has long and slender configuration extending in parallel to said photo sensor array.

6. The invention of claim 5, wherein said first reflecting means has a plurality of rectangular projections or recesses arranged regularly.

7. A light measuring device for a single lens reflex camera having an objective lens and a finder system, comprising:

means, having a light dividing area, for dividing light which has passed through the objective lens into light reflected toward the finder system and light directed through said light dividing area toward a film plane;

means for reflecting the light which has passed through said light dividing area of said dividing means, said reflecting means being located behind the dividing means and almost parallel to said film plane, said reflecting means having a first reflecting means constituted by a plane mirror for reflecting light incident on a predetermined area defined so as to be smaller than an area surrounded by marginal rays of a predetermined F-number of the objective lens, said marginal rays being incident on a point on which the optical axis of the objective lens intersects the film plane, and second reflecting means, providing around said first reflecting means, for reflecting light incident thereon, said second reflecting means having a diffusive characteristic;

means for detecting a focusing condition of the objective lens, said detecting means including at least a photo sensor array which has a plurality of light receiving elements arranged in a row, said photo sensor array being directed to receive the light reflected from said first reflecting means; and means for measuring light which has passed through said objective lens, said measuring means including a light receiving element positioned to receive the light reflected from said second reflecting means, and means for condensing the light reflected from said second reflecting means to said light receiving element, said condensing means being located near said light receiving element.

* * * * *